United States Patent
Tseng (10) Patent No.: US 8,427,989 B2
(45) Date of Patent: Apr. 23, 2013

(54) METHOD FOR IMPROVING DISCONTINUOUS RECEPTION FOR A WIRELESS COMMUNICATION SYSTEM AND RELATED COMMUNICATION DEVICE

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 595 days.

(21) Appl. No.: 12/327,820

(22) Filed: Dec. 4, 2008

(65) Prior Publication Data

US 2009/0147727 A1 Jun. 11, 2009

Related U.S. Application Data

(60) Provisional application No. 60/992,672, filed on Dec. 5, 2007.

(51) Int. Cl.
*G08C 17/00* (2006.01)
*H04Q 7/00* (2006.01)

(52) U.S. Cl.
USPC ........... 370/311; 370/328; 370/350; 370/389; 370/395.4

(58) Field of Classification Search ........................ None
See application file for complete search history.

(56) References Cited

U.S. PATENT DOCUMENTS

| | | | | |
|---|---|---|---|---|
| 2003/0123403 A1* | 7/2003 | Jiang | | 370/328 |
| 2005/0022098 A1* | 1/2005 | Vayanos et al. | | 714/776 |
| 2005/0163161 A1* | 7/2005 | Wei et al. | | 370/469 |
| 2009/0046627 A1* | 2/2009 | Xu | | 370/328 |
| 2009/0046650 A1* | 2/2009 | Dalsgaard et al. | | 370/329 |
| 2009/0052367 A1* | 2/2009 | Cai et al. | | 370/315 |
| 2009/0103500 A1* | 4/2009 | Malkamaki et al. | | 370/336 |

FOREIGN PATENT DOCUMENTS

| | | |
|---|---|---|
| EP | 1 326 397 A2 | 7/2003 |
| JP | 2003264607 A | 9/2003 |
| JP | 2004007654 A | 1/2004 |
| JP | 2006101428 A | 4/2006 |
| JP | 2007281808 A | 10/2007 |
| KR | 20030060055 A | 7/2003 |
| KR | 1020040067657 A | 7/2004 |
| KR | 1020060039556 A | 5/2006 |
| KR | 1020070097282 A | 10/2007 |
| WO | 2007111480 A1 | 10/2007 |
| WO | 2009022310 A | 2/2009 |

OTHER PUBLICATIONS

3GPP: "3rd Generation Partnership Project; Technical Specification Group Radio Access Network; Evolved Universal Terrestrial Radio Access (E-UTRA) Medium Access Control (MAC) protocol specification (Release 8)", Dec. 2007, 3GPP TS 36.321 V8.0.0, pp. 1-23, XP002521635.

Alcatel-Lucent et al: "Way Forward for DL HARQ operation with DRX" 3GPP Draft TSG-RAN WG2 Meeting #59bis, R2-074562, Oct. 8-12, 2007, XP050137081.

(Continued)

*Primary Examiner* — Yemane Mesfin
*Assistant Examiner* — Christine Duong
(74) *Attorney, Agent, or Firm* — Blue Capital Law Firm, P.C.

(57) ABSTRACT

A method for improving discontinuous reception for a user equipment of a wireless communication system includes separately managing retransmission detecting timings of a plurality of downlink hybrid automatic repeat request (DL HARQ) processes when the discontinuous reception is used in the plurality of DL HARQ processes.

6 Claims, 6 Drawing Sheets

OTHER PUBLICATIONS

Office Action on corresponding foreign application (EP 08021117.0) from EPO dated Apr. 28, 2011.

LG Electronics Inc., Discussion on DRX impact on HARQ, 3GPP TSG-RAN WG2#59bis, Oct. 8-12, 2007, Shanghai, China (R2-074233).

3GPP support team. Draft1 minutes of the 59bis TSG-RAN meeting#60, Nov. 5-9, 2007, Korea (R2-075189).

3GPP TS 36.321 V2.0.0 (Nov. 2007).

Nokia Corporation, et al., DL HARQ operation with DRX, 3GPP TSG-RAN WG2 Meeting #59bis, Shanghai, China, Oct. 8-12, 2007 (R2-073944).

Office Action on corresponding foreign application (JP2008-310305) from JPO dated Aug. 30, 2011.

Office Action on corresponding foreign application (JP2008-310303) from JPO dated Sep. 6, 2011.

\* cited by examiner

METHOD FOR IMPROVING DISCONTINUOUS RECEPTION FOR A WIRELESS COMMUNICATION SYSTEM AND RELATED COMMUNICATION DEVICE

CROSS REFERENCE TO RELATED APPLICATIONS

This application claims the benefit of U.S. Provisional Application No. 60/992,672, filed on Dec. 5, 2007 and entitled "Method and Apparatus for Improving Discontinuous Reception operation", the contents of which are incorporated herein by reference.

BACKGROUND OF THE INVENTION

1. Field of the Invention

The present invention relates to a method for improving discontinuous reception for a wireless communication system and related communication device, and more particularly, to a method for improving discontinuous reception of a Hybrid Automatic Repeat Request (HARQ) process for a wireless communication system and related communication device.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates. However, due to demand for high-speed and multimedia applications, the next generation mobile telecommunications technology and related communication protocols have been developed.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simpler.

The MAC layer of a user equipment (UE) includes a Hybrid Automatic Repeat Request (HARQ) entity for simultaneously executing a plurality of HARQ processes for performing a plurality of data transmissions simultaneously.

According to structure of the LTE system, discontinuous reception (DRX) is utilized in the MAC layer, allowing the UE to enter a sleep mode during certain periods, and then stop monitoring a Physical Downlink Control Channel (PDCCH). Regarding a downlink (DL) HARQ process, the UE maintains an HARQ RTT Timer for providing a certain amount of Transmission Time Intervals (TTIs) for the UE to start performing a retransmission detection of the downlink HARQ process after this period. In this application, HARQ RRT timer is hereinafter abbreviated as RTT timer.

When a network terminal indicates the UE to perform a retransmission of the downlink HARQ process, the UE starts the RTT Timer and enters the sleep mode. The UE is awaked and detects whether retransmission information is sent on the PDCCH at expiry of the RTT Timer. The UE only utilizes a RTT timer to manage retransmission detection of multiple downlink HARQ processes.

Figure 1:
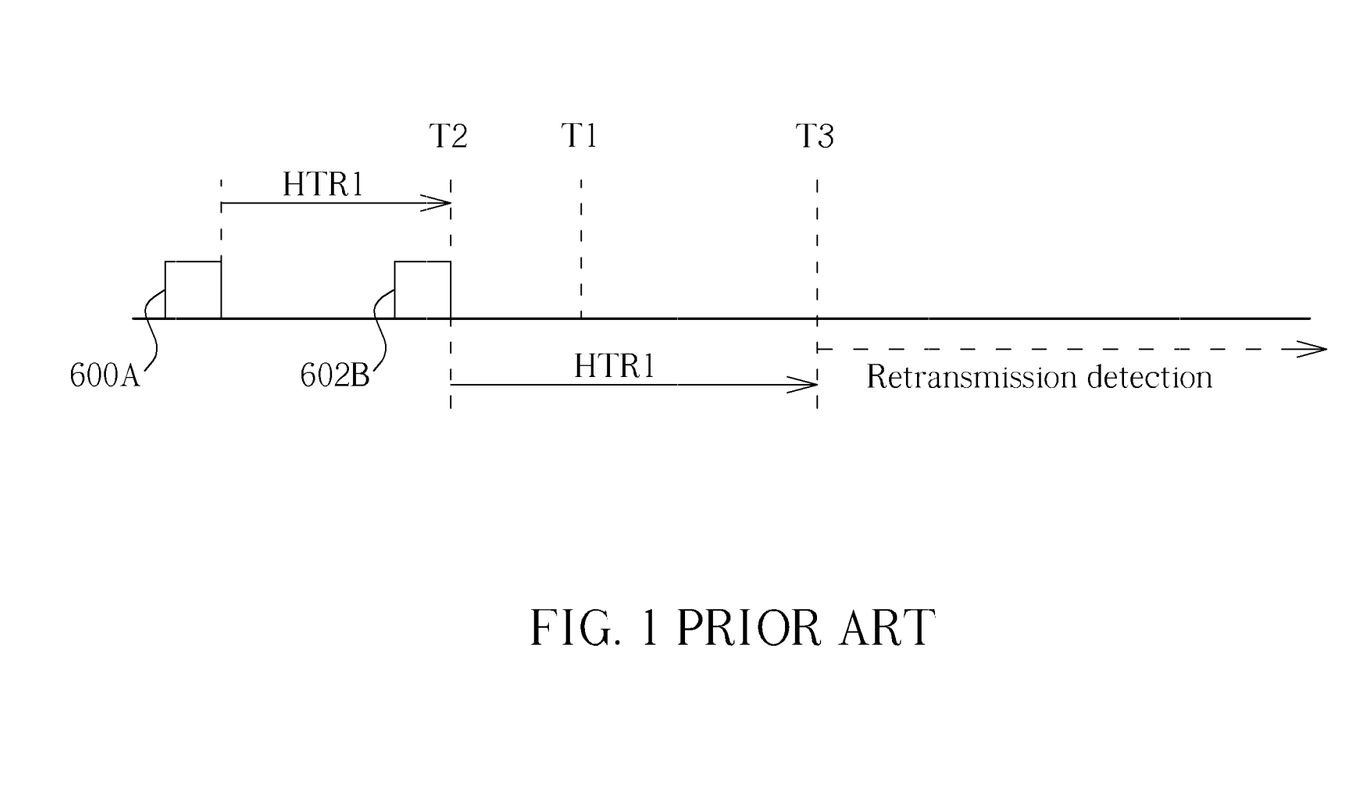
FIG. 1 is a schematic diagram of managing retransmission detecting timings according to the prior art.

Please refer to FIG. 1, which is a schematic diagram of retransmission detecting timings of a downlink HARQ process managed by a UE according to the prior art. The UE uses downlink HARQ processes A and B to receive packets 600A and 602B respectively. When the UE fails to decode the packet 600A, a RTT Timer HTR1 starts to count, and retransmission detection of the packet 600A would be started if the RTT Timer HTR1 expires at a time T1. In this period of the RTT Timer HTR1, the UE stays in the sleep mode. Generally, the UE is awaked at the time T1 for detecting the retransmission of the packet 600A. However, when the packet 602B is failed to be decoded at a time T2, the RTT timer HTR1 starts to recount and thereby expires at a time T3. In this situation, for the downlink HARQ process A of the packet 600A, an expected time the UE starts to detect the retransmission of the packet 600A is postponed from the time T1 to the time T3. If an eNB (evolved Node-B) schedules the retransmission of the packet 600A between the time T1 and T3, the UE is unable to detect the retransmission of the packet 600A, and thereby misses the chance of re-receiving data of the packet 600A.

According to the prior art, the plurality of downlink HARQ processes of the UE may delay a part of the retransmission detecting timings because the retransmission detecting timings are managed by the same RTT Timer. Thus, probability that the UE misses retransmission packets is increased, and flexibility of scheduling retransmission at the network side is reduced.

SUMMARY OF THE INVENTION

Therefore, the present invention provides a method for improving discontinuous reception for a UE of a wireless communication system and related communication device, to enhance flexibility of scheduling retransmission.

The present invention discloses a method for improving discontinuous reception for a user equipment of a wireless communication system. The method includes separately managing retransmission detecting timings of a plurality of downlink hybrid automatic repeat request (DL HARQ) processes when the discontinuous reception is used in the plurality of DL HARQ processes.

The present invention further discloses a communication device utilized in a wireless communication system for improving discontinuous reception, to enhance flexibility of scheduling retransmission processes. The communication device includes, a processor, for executing a process, and a storage device coupled to the processor, for storing a program for executing the process. The process includes separately managing retransmission detecting timings of a plurality of DL HARQ processes when the discontinuous reception is used in the plurality of DL HARQ processes.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
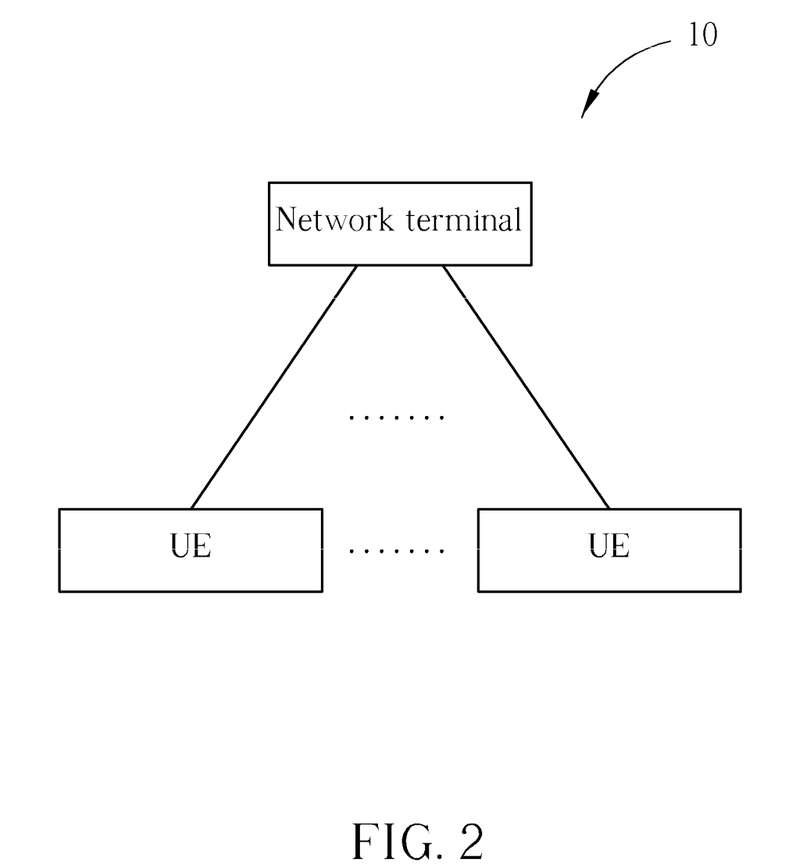
FIG. 2 is a schematic diagram of a wireless communication system.

Please refer to FIG. 2, which is a schematic diagram of a wireless communications system 100. The wireless communications system 100 is preferred to be a LTE (Long Term Evolution) system, and is briefly formed with a network terminal and a plurality of user equipments. In FIG. 2, the network terminal and the user equipments (UEs) are simply utilized for illustrating the structure of the wireless communications system 100. Practically, the network terminal may include a plurality of base stations, radio network controllers, and so on according to actual demands, and the UEs can be apparatuses such as mobile phones, computer systems, etc.

Figure 3:
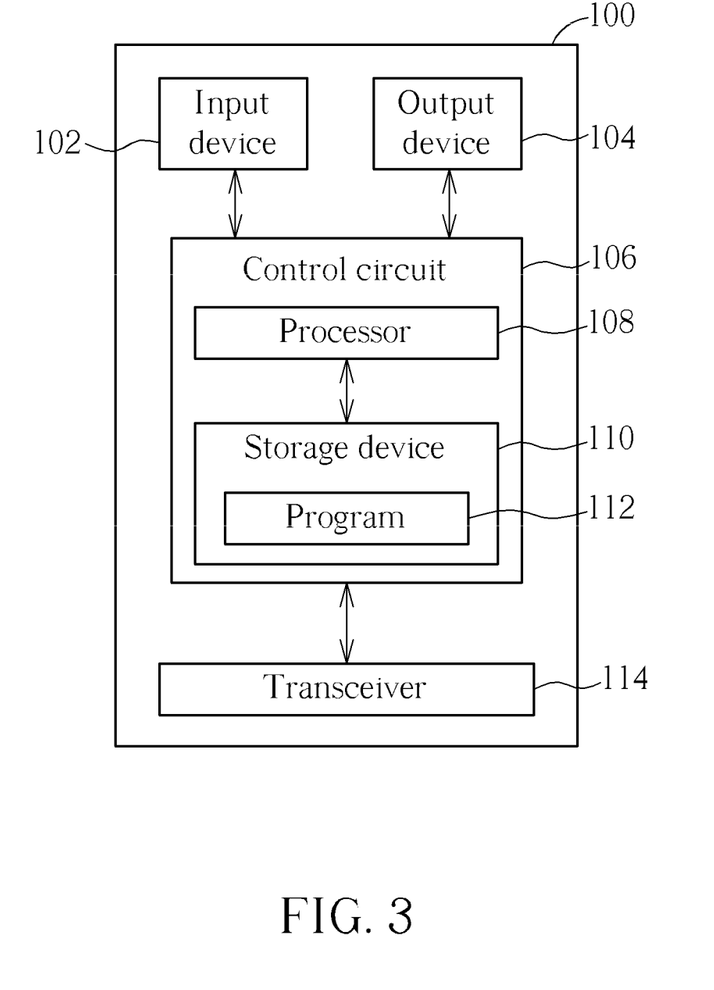
FIG. 3 is a functional block diagram of a wireless communication device.

Please refer to FIG. 3, which is a functional block diagram of a communications device 100, which can be utilized for implementing the user equipments shown in FIG. 2. For the sake of brevity, FIG. 3 only shows an input device 102, an output device 104, a control circuit 106, a processor 108, a storage device 110, a program 112, and a transceiver 114 of the communications device 100. In the communications device 100, the control circuit 106 executes the program 112 in the storage device 110 through the processor 108, thereby controlling an operation of the communications device 100. The communications device 100 can receive signals inputted by a user through the input device 102, such as a keyboard, and can output images and sounds through the output device 104, such as a monitor or speakers. The transceiver 114 is used for receiving and transmitting wireless signals, delivering received signals to the control circuit 106, and outputting signals generated by the control circuit 106 wirelessly. From a perspective of a communications protocol framework, the transceiver 114 can be seen as a portion of Layer 1, and the control circuit1 206 can be utilized to realize functions of Layer 2 and Layer 3.

Figure 4:
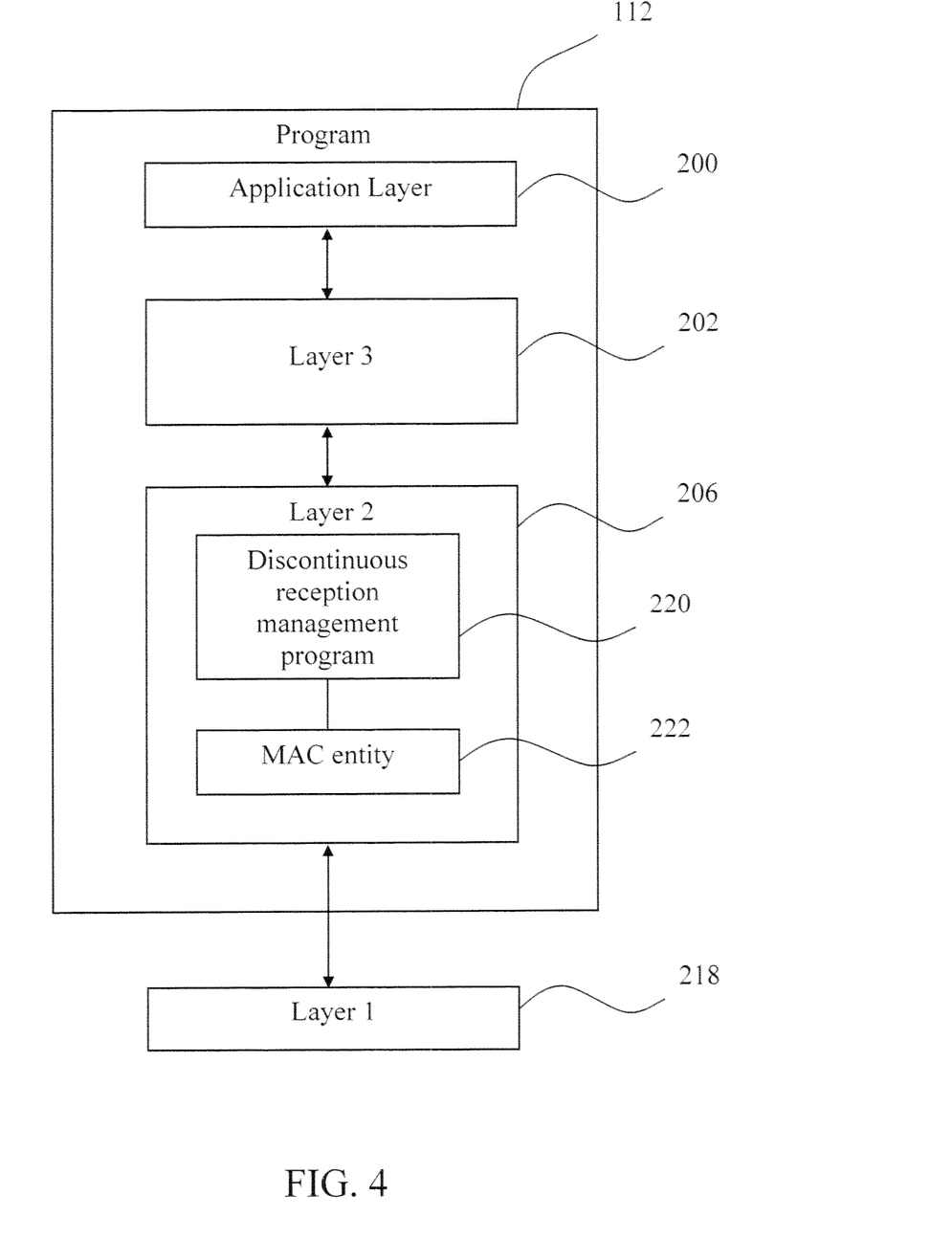
FIG. 4 is a schematic diagram of a program shown in FIG. 3.

Please continue to refer to FIG. 4, which is a schematic diagram of the program 112 shown in FIG. 3. The program 112 includes an application layer 200, a Layer 3 202, and a Layer 2 206, and is coupled to a Layer 1 208. A Media Access Control (MAC) entity 222 is in the Layer 2 206, for simultaneously performing a plurality of downlink HARQ (DL HARQ) processes with an evolved Node B (eNB) for receiving packets, and supporting discontinuous downlink reception controlling the MAC entity 222 to enter a sleep mode in a period of time when a received packet is decoded unsuccessfully.

Figure 5:
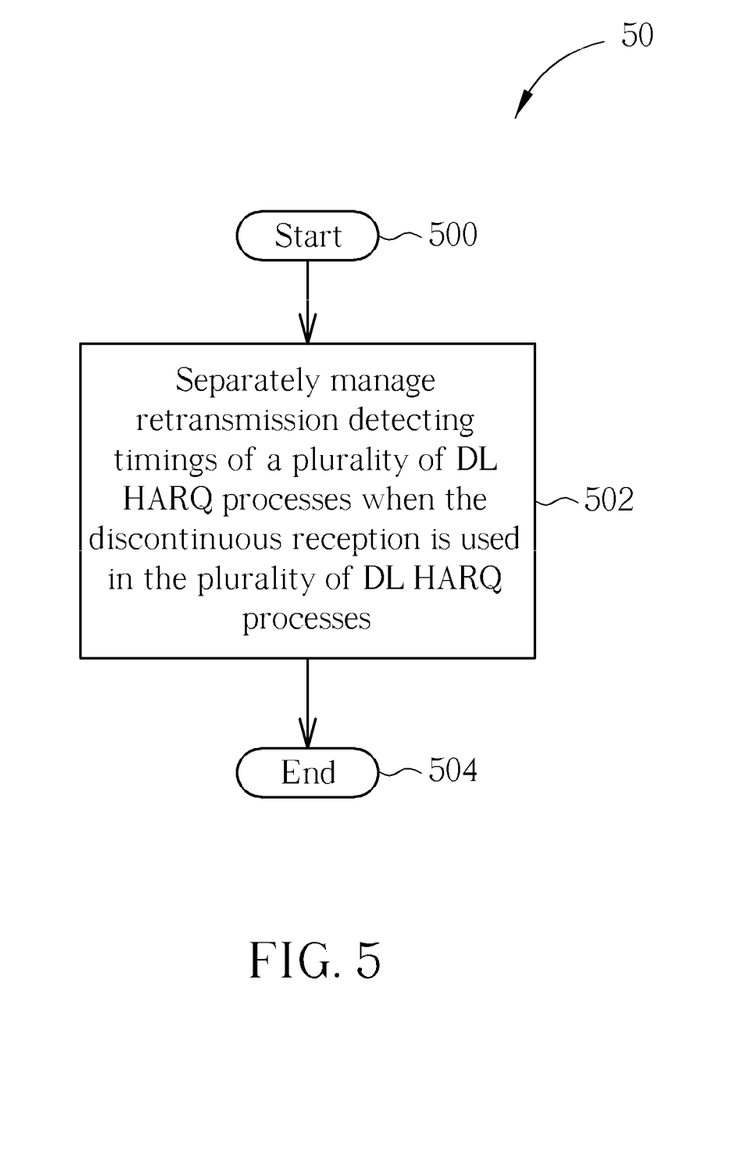
FIG. 5 is a flowchart diagram according to an embodiment of the present invention.

When the MAC entity 222 uses the plurality of HARQ processes, the program 112 of the embodiment of the present invention provides a discontinuous reception management program 220 for avoiding missing retransmission packets. Please refer to FIG. 5, which is a schematic diagram of a process 50 according to an embodiment of the present invention. The process 50 is utilized in a user equipment of the wireless communication system for improving discontinuous reception. The process 50 can be compiled into the discontinuous reception management program 220, and includes the following steps:

Step 500: Start.

Step 502: Separately manage retransmission detecting timings of a plurality of DL HARQ processes when the discontinuous reception is used in the plurality of DL HARQ processes.

Step 504: End.

According to the process 50, when the discontinuous reception is used in the plurality of DL HARQ processes, the UE separately manages the retransmission detecting timings of the plurality of DL HARQ processes. In other words, when the plurality of DL HARQ processes need to receive retransmission information, the retransmission detecting timings are separately operated without affecting each other, and receives retransmission information when detecting a retransmission.

Preferably, the UE assigns a HARQ RTT Timer to each DL HARQ process to detect retransmission information of a DL HARQ process sent on a Physical Downlink Control Channel (PDCCH) according to the corresponding HARQ RTT Timer. HARQ RRT timer is hereinafter abbreviated as RTT timer for reading easily.

For example, the embodiment of the present invention is used for solving the problem of the prior art shown in FIG. 1. Please refer to FIG. 6, which is a schematic diagram of retransmission detecting timings of the UE managing DL HARQ processes A and B. As defined above, the suffixes A and B of the packets 600A and 602B respectively indicate corresponding DL HARQ process. As can be seen from FIG. 6, the UE assigns and starts a RTT Timer HTR1 when the packet 600A is failed to be decoded, and starts to detect a retransmission of the packet 600A when the RTT Timer HTR1 expires at a time T1. When the packet 602B is failed to be decoded, the UE assigns and starts a RTT Timer HTR2 which is the same with the RTT Timer HTR1, rather than restarts the RTT Timer HTR1. After the time T1, the UE is awaked and starts to detect retransmission. As can be seen, the UE utilizes the RTT Timers HTR1 and HTR2 for separately managing the retransmission detecting timings of the DL HARQ processes A and B. Therefore, if the eNB schedules a retransmission of the packet 600A between time T1 and T3, missing of the retransmission packet of the packet 600A or an unnecessary transmission delay can be avoided since the UE starts to detect retransmission from the time T1. As can be seen from the above, the UE allows maintaining a plurality of RTT timers.

Figure 6:
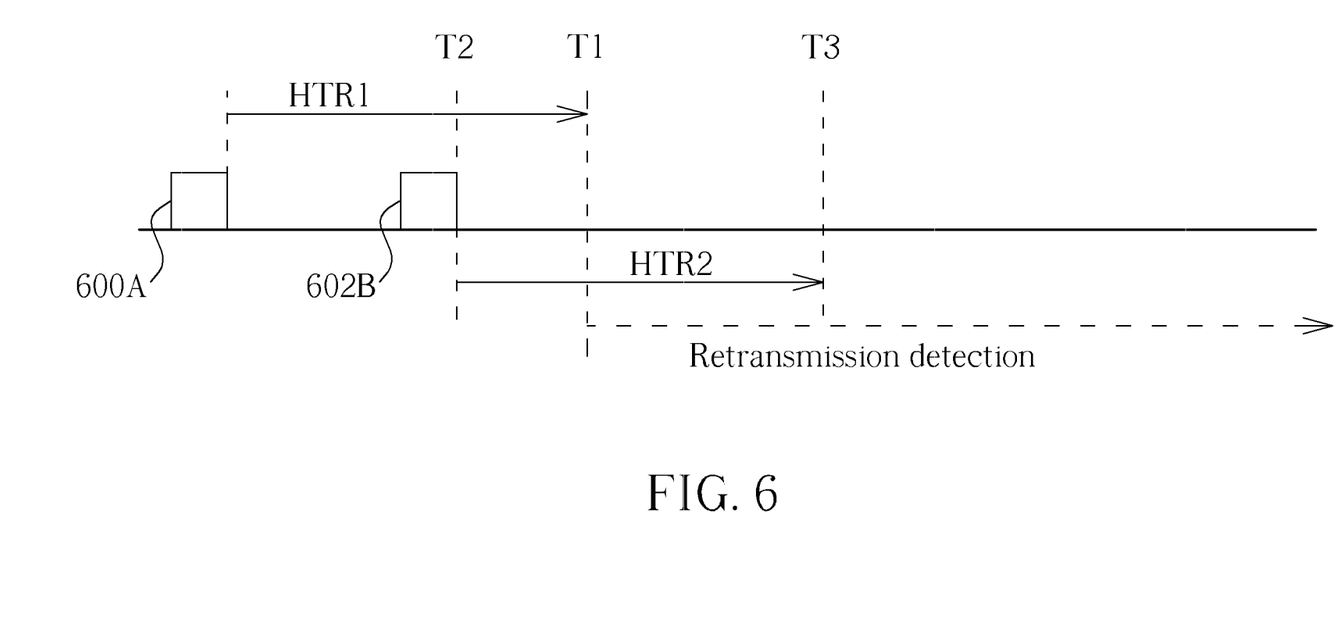
FIG. 6 is a schematic diagram of managing retransmission detecting timings according to an embodiment of the present invention.

The embodiment shown in FIG. 6, the UE can start a RTT timer when a packet is detected. For example, when the UE detects the packet 600A, the UE starts the RTT timer HTR1, and determines whether the packet 600A is failed to be decoded at expiry of the RTT timer HTR1.

In conclusion, the UE of the present invention embodiments separately manages retransmission detection timings of the DL HARQ process, for avoiding missing retransmission packets and furthermore enhancing flexibility of scheduling retransmission process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving discontinuous reception for a user equipment of a wireless communication system, the method comprising:

a user equipment (UE) separately managing retransmission detecting timings of a plurality of overlapping downlink hybrid automatic repeat request (DL HARQ) processes when the discontinuous reception is used in the plurality of DL HARQ processes by assigning an HARQ round trip time timer (HARQ RTT Timer) to each DL HARQ process of the plurality of DL HARQ processes; and starting the HARQ RTT Timer when receiving packets of corresponding DL HARQ process.

2. The method of claim 1, wherein the retransmission detecting timings of the plurality of DL HARQ processes are timings of detecting retransmission information sent on a physical downlink control channel in the plurality of DL HARQ processes.

3. A communication device of a wireless communication system for improving discontinuous reception to enhance flexibility of scheduling retransmission processes, the communication device comprising:
   a processor, for executing a process; and
   a storage device coupled to the processor, for storing a program for executing the process;
   wherein the process comprises:
   separately managing retransmission detecting timings of a plurality of overlapping downlink hybrid automatic repeat request (DL HARQ) processes when the discontinuous reception is used in the plurality of DL HARQ processes by assigning an HARQ round trip time timer (HARQ RTT Timer) to each DL HARQ process of the plurality of DL HARQ processes; and
   starting the HARQ RTT Timer when receiving packets of corresponding DL HARQ process.

4. The communication device of claim 3, wherein the retransmission detecting timings of the plurality of DL HARQ processes are timings of detecting retransmission information sent on a physical downlink control channel in the plurality of DL HARQ processes.

5. The method of claim 1, wherein overlapping DL HARQ processes is defined by using a HARQ process for a new transmission or a retransmission when a transmission of another HARQ process has not finished yet.

6. The device of claim 3, wherein overlapping DL HARQ processes is defined by using a HARQ process for a new transmission or a retransmission when a transmission of another HARQ process has not finished yet.

* * * * *